July 7, 1936.  E. H. BODDY ET AL  2,046,997
WIRE FEEDING DEVICE
Filed March 17, 1934  2 Sheets-Sheet 1

Inventors:
Edwin H. Boddy,
Ethan W. Vars,
by Harry E. Dunham
Their Attorney.

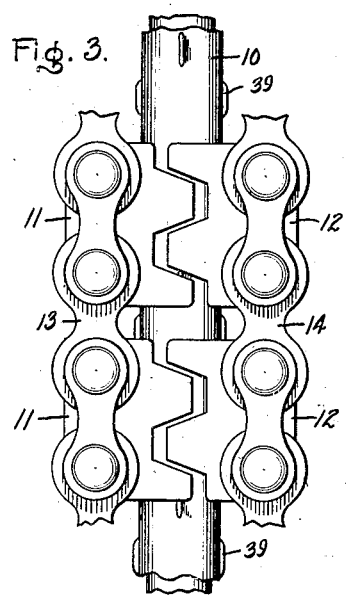
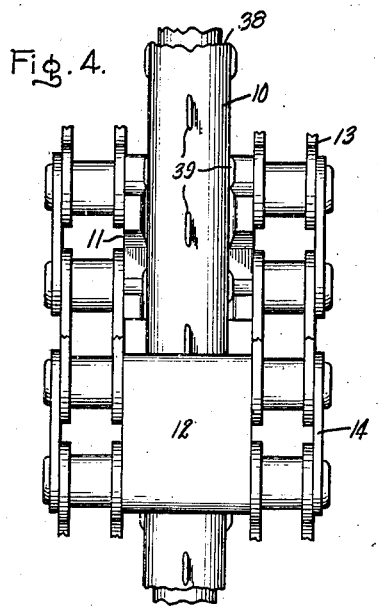
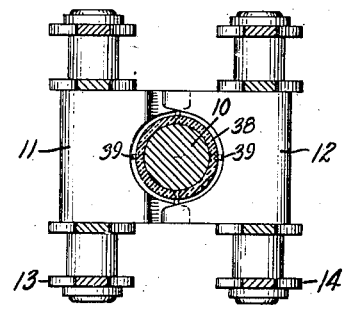
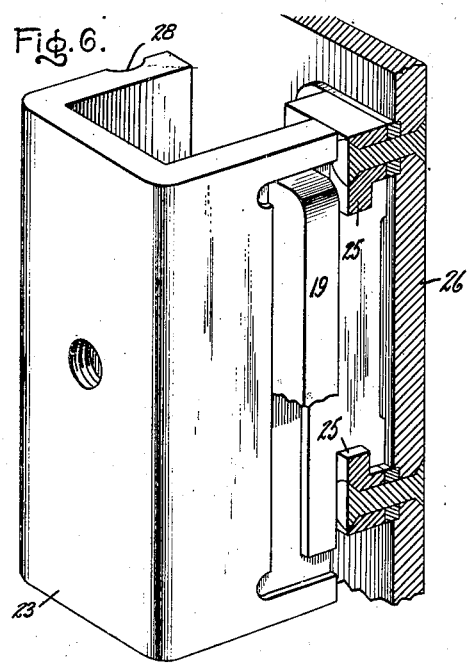
Inventors:
Edwin H. Boddy
Ethan W. Vars,
by Harry E. Dunham
Their Attorney.

Patented July 7, 1936

2,046,997

UNITED STATES PATENT OFFICE 2,046,997

WIRE FEEDING DEVICE

Edwin Harley Eoddy and Ethan W. Vars, Erie, Pa., assignors to General Electric Company, a corporation of New York Application March 17, 1934, Serial No. 716,208

6 Claims. (Cl. 219—8)

Our invention relates to wire feeding devices which may also be used for supplying electric current to the wires fed thereby.

It is an object of our invention to provide a wire feeding device of the character above described which is of particular utility for feeding welding electrodes.

More particularly it is an object of our invention to provide electrode feeding means which completely surrounds the electrode and which is capable of making contact with substantially the entire circumferential surface of a predetermined length of the electrode.

Figure 1:
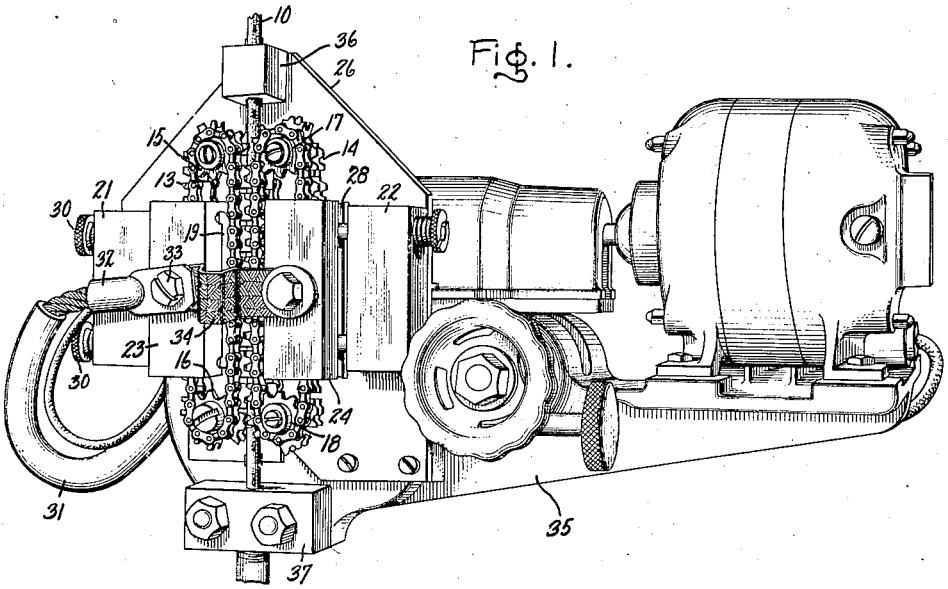
Figure 2:
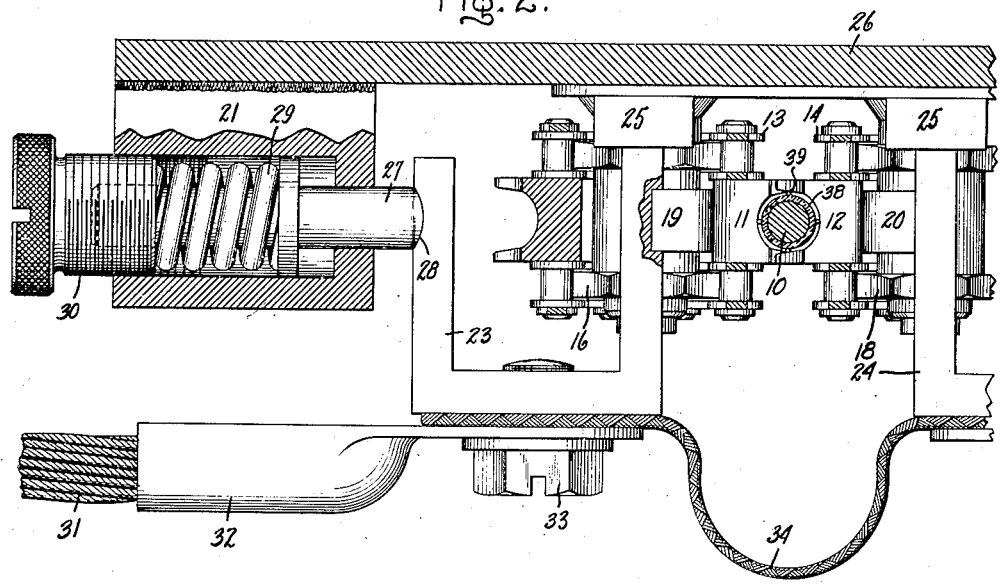

Other objects of our invention will become apparent from a consideration of the following description taken in connection with the accompanying drawings, Fig. 1 of which shows one embodiment of our invention as applied to an automatic arc welding head; Fig. 2 of which shows a top view partly in section of the feeding device illustrated in Fig. 1; Figs. 3, 4, and 5 of which are side and plan views showing the manner in which the complementary jaw members of our device completely surround an electrode and are in contact-making position with substantially the entire circumferential surface of a predetermined length thereof, and Fig. 6 of which shows in perspective the construction of the yoke member of our device by means of which pressure is applied to the jaw members which enclose the electrode.

In Fig. 1 of the drawings one embodiment of our invention is shown as an electrode feeding device forming part of an automatic arc welding head. The arrangement illustrated is particularly suited for feeding electrodes having a coating of flux through which extend projections separated from one another circumferentially as well as lengthwise of the electrode and of a height equal to or slightly greater than the thickness of the flux coating. Electrodes of this construction are particularly described and claimed in the application of one of us, Ethan W. Vars, Serial No. 692,348, filed October 5, 1933, for Flux coated electrodes and method of making the same. It is to be understood, however, that our invention is not limited to feeding electrodes of the above construction but may be used for feeding bar electrodes or heavy coated electrodes of all shapes and constructions.

The wire feeding device of our invention comprises a series of blocks supported by belts and pulleys by means of which they are given an extended movement substantially parallel to the longitudinal axis of the wire over guiding means through the agency of which they are forced into engagement with the wire. In the arrangement illustrated in the drawings the contact blocks are complementary jaw members 11 and 12 which completely enclose an electrode 10. These jaw members are connected into endless chains 13 and 14 which are supported on sprockets 15, 16, 17, and 18. At least one of these sprockets is connected to the propelling mechanism of the welding head by means of which it is rotated in one direction or the other to propel said chains in one direction or the other to feed the electrode toward and away from the work. It will be noted that the jaw members are provided with interlocking portions and that the movement of one chain will therefore communicate movement to the other chain if but one sprocket is used as a driver.

The jaw members 11 and 12 are carried by chains 13 and 14 over the opposed parallel guiding surfaces of shoes 19 and 20. These jaw members are pressed into contact-making position with the electrode 10 by pressure means 21 and 22 located exterior to and in substantially the same plane as the loops formed by the chains 13 and 14. These pressure means are connected to the shoes 19 and 20 by yoke members 23 and 24 which span the chains 13 and 14. Yoke 23 is shown in perspective in Fig. 6 of the drawings. It will be noted that it comprises a U-shaped member, one end of which is slotted to engage guides 25 riveted to a plate 26 forming the supporting frame of the feeding device. The pressure means comprises blocks within which are supported plungers 27. These plungers are adapted to engage a groove 28 in the yokes and are pressed into engagement therewith by springs 29 enclosed within the blocks constituting part of the pressure means. The tension of these springs and the pressure of the plungers 27 on the yokes 23 and 24 may be adjusted by an adjusting screw 30 also supported in these blocks.

Welding current is supplied to the electrode through a conductor 31, the terminal 32 of which is connected to one of the yoke members 23 by means of a screw 33. The yoke member 24 is electrically connected to the yoke member 23 by a flexible conductor 34. The yoke members 23 and 24, shoes 19 and 20, and the jaw members 11 and 12 are formed of electrically conductive material. The plate 26 forming the supporting framework for the feeding device above described is electrically insulated from the welding head 35 with which it is associated.

The welding electrode 10 is directed to and from the feeding device by guides 36 and 37.

The feeding device above described functions as follows. The welding head 35 by rotating one or more of the sprockets 15, 16, 17, and 18 conveys an endless succession of pairs of jaws 11 and 12 along a rectilinear path determined by the opposed parallel guiding surfaces of the elongated shoes 19 and 20 by means of which they are forced into engagement with the electrode. The complementary jaw members 11 and 12 of the feeding chains 13 and 14 completely surround a predetermined length of the electrode and engage it at the projections 39 which are separated from one another circumferentially as well as lengthwise of the electrode and are of a height equal to or slightly greater than the thickness of the flux coating 38 on the electrode. Welding current is supplied by conductor 31 to the jaw members 11 and 12 which are electrically connected thereto through the agency of conductor 34, yokes 23 and 24 and shoes 19 and 20.

It will be noted that the pressure exerting means, the chains, sprockets and shoe members are supported in substantially the same plane, that the jaw members are conveyed in closed paths which pass between the guide members and between the pressure means and the guide members, and that pressure is applied to the guide members or shoes through the agency of yoke members which span the chains constituting the conveyor means for the complementary jaw members.

It is of course apparent that the electrode engaging surface of the jaw members may be given any suitable configuration without departing from our invention. The forming of the jaw members so that complementary members completely enclose the electrode and are forced into contact-making position with the entire circumferential surface of a predetermined length of the electrode is, however, an important feature of our invention. When such a construction is employed the feeding device of our invention becomes of particular utility for feeding electrodes having a coating of flux through which extend projections by means of which welding current is supplied to the electrode. It is to be understood, however, that the feeding device illustrated may be used for feeding bare wires or electrodes and for supplying electrode current thereto.

What we claim as new and desire to secure by Letters Patent of the United States, is:—

1. An electrode feeding device for welding machines comprising an endless series of electrically conductive complementary jaw members which when pressed into engagement with an electrode are in contact making position with substantially the entire circumferential surface thereof, means for successively pressing said jaw members into contact making position with an electrode, and means for supplying welding current to said jaw members.

2. An electrode feeding device for welding machines comprising an endless series of electrically conductive complementary jaw members which when pressed into engagement with an electrode are in contact making position with substantially the entire circumferential surface thereof, means for imparting to said jaw members an extended movement substantially parallel to the longitudinal axis of said electrode, means for successively compressing said jaw members into engagement with said electrode, and means for supplying welding current to said jaw members.

3. Apparatus comprising a series of closely spaced blocks of electrically conductive material connected together to form an endless belt, an elongated shoe member of electrically conductive material located in the loop formed by said belt, means for propelling said belt along said shoe member, pressure means exterior to the loop formed by said belt, a support for said pressure means, a yoke of electrically conductive material electrically connected to said shoe, spanning said belt and connecting said pressure means to said shoe, guiding means on said support for engaging the end of said yoke within said belt, and means for supplying welding current to said yoke.

4. An electrode feeding device comprising parallel electrically conductive guide members, pressure means lying in substantially the same plane as said guide members, a plurality of electrically conductive complementary jaw members, means for conveying opposite jaw members which when closed on an electrode are in contact making position with substantially the entire circumferential surface thereof in closed paths which pass between said guide members and between said pressure means and said guide members, yokes of electrically conductive material electrically connected to said guide members, spanning said conveyor means and connecting said pressure means to said guide members, and means for supplying welding current to said yokes.

5. An electrode feeding device comprising parallel electrically conductive guide members, pressure means lying in substantially the same plane as said guide members, a plurality of electrically conductive interlocking jaw members which when clamped about an electrode are in contact making position with substantially the entire circumferential surface thereof, means for connecting opposite jaw members into endless chains, means including sprockets for directing said chains between said guide members with complementary jaw members clamped between said guide members and about an electrode, means for driving at least one of said sprockets, means spanning said chains for connecting said pressure means to said guide members, and means for supplying welding current to said guide members.

6. An electrode feeding device comprising jaws which when opposite one another and pressed into contact-making position with an electrode to be fed thereby interlock with one another, means for connecting opposite jaw members into endless chains, means for supporting said chains for movement in paths parts of which are substantially parallel to the longitudinal axis of said electrode, means for pressing interlocking jaw members into engagement with said electrode and with one another, and means for propelling at least one of said chains.

EDWIN HARLEY BODDY.
ETHAN W. VARS.